United States Patent [19]

Jankowski

[11] Patent Number: 5,044,782
[45] Date of Patent: Sep. 3, 1991

[54] SEALED TAPERED ROLLER BEARING ASSEMBLY FOR AIRCRAFT WHEEL BEARING SYSTEM

[75] Inventor: Richard B. Jankowski, South Bend, Ind.

[73] Assignee: Allied-Signal Inc., Morristown, N.J.

[21] Appl. No.: 582,722

[22] Filed: Sep. 14, 1990

[51] Int. Cl.$^5$ .............................................. F16C 33/78
[52] U.S. Cl. .................................... 384/482; 384/477
[58] Field of Search ............... 384/482, 484, 486, 477, 384/571, 480

[56] References Cited

U.S. PATENT DOCUMENTS

| | | | |
|---|---|---|---|
| 2,690,362 | 9/1954 | Kindig . | |
| 3,113,814 | 12/1963 | Ogura | 303/187.2 |
| 3,473,856 | 10/1969 | Helms | 303/187.2 |
| 3,519,316 | 7/1970 | Göthberg . | |
| 4,336,971 | 6/1982 | Reiter . | |
| 4,440,403 | 4/1984 | Urano et al. | 277/81 R |
| 4,502,739 | 3/1985 | Flander | 384/484 |
| 4,605,319 | 8/1986 | Korenhof | 384/484 |
| 4,692,040 | 9/1987 | Ebaugh et al. | 384/484 |
| 4,830,518 | 5/1989 | Shiratani et al. | 384/482 |
| 4,856,916 | 8/1989 | Ito et al. | 384/484 |
| 4,872,770 | 10/1989 | Dickinson | 384/484 |
| 4,948,271 | 8/1990 | Nunotani et al. | 384/482 |

Primary Examiner—Lenard A. Footland
Attorney, Agent, or Firm—Larry J. Palguta; Ken C. Decker

[57] ABSTRACT

The sealed tapered roller bearing assembly (10, 111, 211, 311) of the present invention comprises a bearing assembly (10, 111, 211, 311) which may be removed or serviced without destroying or damaging the assembly (10, 111, 211, 311). Inner and outer races (30, 40) contain tapered rollers (60) therebetween, and a positioning ring (70) is disposed intimately about the outer race (40) as a result of the outer race (40) and ring (70) being pressfitted together. The ring (70) extends from an axial portion (76) to a radial portion (78) which becomes an angled feed tapered section (80) that extends into a first end member axial part (82). The tapered section (80), axial part (82) and a dam seal (90) define a lubricant dam area (100) about a first end of a space (95) between the races (30, 40). A second end of the space (95) between the races (30, 40) is enclosed by a composite seal member (120, 121, 221, 321) that has a first resilient foot, end, portion, or arm (124, 125, 214, 312) engaging an axial extension (72) of the axial portion (76) of the ring (70), and a second resilient foot or lip (126, 126A, 224, 324) engaging the inner race (30). For service or inspection, the entire bearing assembly (10, 111, 211, 311) may be removed easily, or just part of the bearing assembly may be removed, all without damaging or destroying the assembly (10, 111, 211, 311).

15 Claims, 2 Drawing Sheets

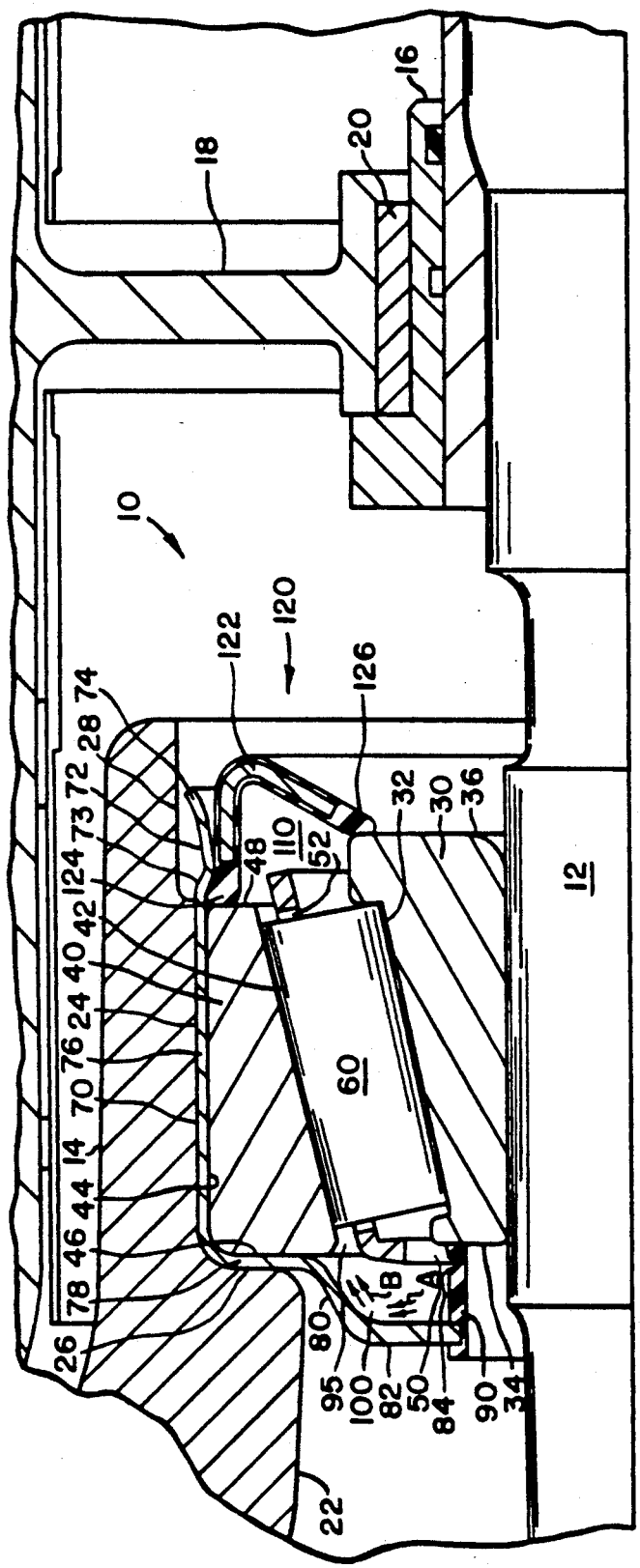
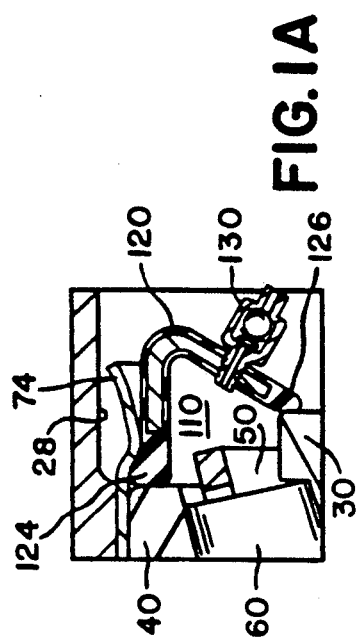
FIG. 1
FIG. 1A

SEALED TAPERED ROLLER BEARING ASSEMBLY FOR AIRCRAFT WHEEL BEARING SYSTEM

The present invention relates generally to a sealed roller bearing assembly, and in particular to a sealed tapered roller bearing assembly for an aircraft wheel bearing system.

Aircraft wheels are supported on the axles by means of roller bearing assemblies which contain a sufficient amount of grease to enable the bearing assembly to operate efficiently. However, it is common for grease within the rolling bearing assembly to migrate out of the assembly as a result of the high centrifugal forces experienced during landing and take-off of the aircraft. Eventually, the rollers or bearing members of the bearing assembly may become scored as a result of high heat that occurs because of the lack of lubricant within the bearing assembly. Bearing assemblies tend to be provided as unitary assemblies such that the unitary assembly cannot be serviced or taken apart without damaging or destroying parts of the assembly. It is highly desirable to provide a bearing assembly to be utilized as part of an aircraft wheel bearing system which retains therein the lubricant or grease, is easily inspected, is easily disassembled either partially or totally for inspection and repair, and which does not require any modification of standard production roller bearings.

The present invention provides solutions to the above problems by providing a bearing assembly, comprising an annular inner race, an annular outer race having an inside diameter greater than an outside diameter of the annular inner race to provide an inner race-outer race annular space, bearing rollers disposed within said space, retaining means spacing said rollers apart from one another, the space having a first diameter at a first axial end which is smaller than a second diameter at a second axial end, and lubricant sealing means disposed about said first and second axial ends, the lubricant sealing means comprising a positioning ring having a first end member disposed over said first axial end and extending to a radial surface of said outer race, the first end member comprising a dam seal extending between the inner race and said ring in order to define a lubricant dam area at said first axial end, the ring formed over said outer race to form a radial portion extending into an axial portion each of which conforms with the shape of and engages said outer race, the axial portion having an axial extension extending axially at said second axial end, and a second end member of the ring comprising a composite seal member extending between said axial extension and said inner race to define a lubricant seal area about said second axial end.

One way of carrying out the present invention is described in detail below with reference to an embodiment in which:

FIG. 1 is a section view of the roller bearing of the present invention disposed within an aircraft wheel;

FIG. 1A is a drawing of the composite seal member of the present invention with an optional lubricant zert disposed therein.

Figure 2:
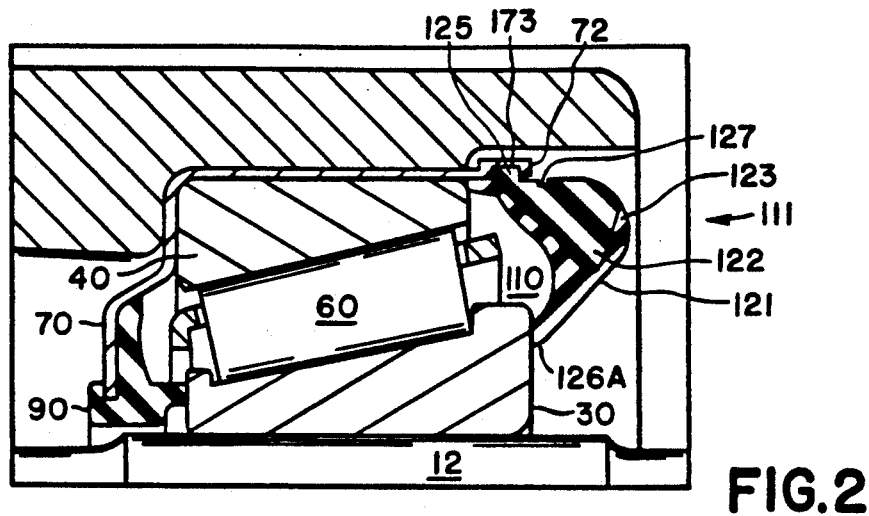
FIGS. 2–4 illustrate alternative embodiments of composite seal members disposed about a grease or lubricant seal area.

The bearing assembly of the present invention is indicated generally by reference numeral 10 in FIG. 1. FIG. 1 is a partial view of an aircraft axle 12 having disposed thereabout a portion of aircraft wheel 14, bronze bushing 16, torque tube pedestal 18, insulator material 20, and the bearing assembly 10 disposed between the wheel and axle. Wheel 14 includes an inner opening 22 having axial portion 24 extending into radial wall 26. Axial portion 24 extends into radially outer axial part 28. Located between the wheel parts 24, 26 and 28, and axle 12 is bearing assembly 10 which comprises an annular inner race or steel cone 30 having angled surface 32, an outer annular race or steel cup 40 having angled surface 42, an axial surface 44 extending into a radial surface 46, and steel cage or retainer means 50 disposed about tapered steel rollers or bearings 60. Retainer means 50 comprises a plurality of openings 52 which position rollers 60 spaced apart from one another and in proper circumferential alignment relative to inner race 30 and outer race 40. Located about axial surface 44 and radial surface 46 of outer race 40, is steel positioning ring 70 which comprises axial extension 72 having radially inwardly angled part 73 and angled axial ramp 74, axial portion or part 76, radial portion or part 78, feed tapered section 80, and first end member radial part 82 extending into lip 84. Steel positioning ring 70 includes a thinner cross-sectional area or thickness at axial portion 76 and radial portion 78 because outer race 40 and steel positioning ring 70 are press-fitted together which causes those parts of the steel positioning ring to be reduced in thickness. First end member radial part 82 and lip 84 cooperate with rubber dam seal 90 which extends between lip 84 and radial sidewall surface 34 of inner race 30. Feed tapered section 80 includes a reduction in its thickness as it extends toward radial portion 78, and is also disposed at an angle relative to radial portion 78 and radial part 82. A first end member of ring 70 comprises the rubber dam seal 90, radial part 82, feed tapered section 80, and defines with races 30 and 40 a grease or lubricant dam area 100 at a first end of space 95 which is an annulus area located between surfaces 32 and 42 of the respective races. A second end of space 95 includes grease or lubricant seal area 110 which is defined by inner and outer races 30, 40, and a second end member of ring 70 which includes angled part 73, ramp 74, and a composite seal member indicated generally by reference numeral 120. Composite seal member 120 includes inner V-shaped metallic member 122 which has molded there inner about a resilient material, either rubber, Teflon ®, or other suitable material which extends into first resilient foot 124 and second resilient foot 126. First resilient foot 124 engaged outer race radial surface 48 and radially inwardly angled part 73 of axial flange 72, and second foot 126 engages radial surface 36 of inner race 30. Axial extension 72 includes ramp 74 which enables composite seal member 120 to be easily inserted into position without resilient foot 124 being damaged during assembly.

During take-offs and landings which cause aircraft wheel 14 to rotate outer race 40 relative to inner race 30, it has been found that grease or lubricant disposed between the races and about rollers 60 tends to migrate toward grease dam area 100 in the direction of arrows A. Prior bearing assemblies which did not enclose the first end of space 95 permit the grease to migrate in the direction of arrow A toward the wheel hub and be lost for lubrication purposes. The bearing assembly of the present invention traps the grease within the grease dam area, and the feed tapered section which is both tapered and disposed at an angle causes the grease (which is migrating under the effects of centrifugal forces) to migrate back in the direction of arrows B toward rollers 60 where it can be utilized. Subsequently, some of the grease will tend to be disposed within grease seal area 110 where it can be utilized by the bearing assembly for the lubrication of rollers 60, while a very small amount of grease remains in grease dam area 100.

As described above, steel positioning ring 70 and outer race 40 are force-fitted together which causes the steel ring to engage intimately race 40 and result in a thinning of the cross-sectional area or thickness of ring 70 at axial portion 76 and radial portion 78. Ring 70 is utilized easily for field service and repairs, because a full thickness ring 70 may be provided for repair purposes wherein a new outer race 40 is pressed into ring 70 and then utilized as part of the bearing assembly in an aircraft wheel.

Bearing assembly 10 also may be modified to enable the easy addition of lubricant to the bearing assembly. FIG. 1A shows an optional grease zert mounted within composite seal member 120. Zert 130 receives the nozzle of any standard lubricant or greasing device so that grease will be transmitted into grease seal area 110.

Figure 3:
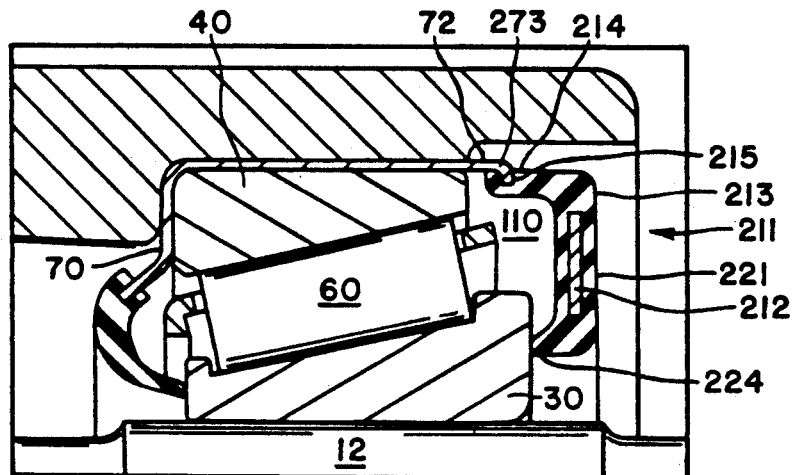
Figure 4:
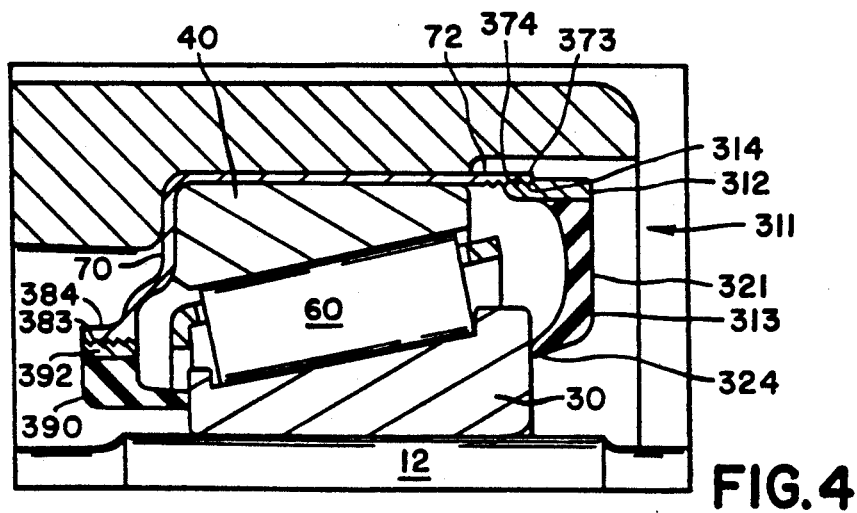

FIGS. 2-4 illustrate alternative embodiments of composite seals that may be utilized as part of a second end member about lubricant seal area 110. In FIG. 2, bearing assembly 111 comprises generally the same parts as described above in FIG. 1 but includes a composite seal member 121 which includes an inner and outer hard rubber or heel stock material 128 disposed within portions a flexible seal material such as Nitrile ® 123 which effects sealing engagement. The flexible material 123 includes a flexible sealing lip 126A which engages inner race 30. Heel stock material 128 includes a generally rectangular-shaped end 125 which is received within a grooved opening 173 of axial extension 72. Composite seal member 121 is easily snap fitted into place, and includes a plurality of notches 127 which may receive a prying means such as a screw driver in order to disengage end 125 from opening 173 so that composite member seal 121 is easily removed from bearing assembly 111.

FIG. 3 shows another embodiment of a composite seal member 221 of a bearing assembly 211. Composite seal member 221 includes a rubber flexible seal material 213 having therein a metal ring 212. Composite seal member 221 includes a resilient foot 224 which engages inner race 30 and a radially outer arm 214 which includes a groove 215 that receives radial extension 273 of axial extension 72. Composite seal member 221 of bearing assembly 211 comprises a portion of the second end member of assembly 211 which defines a part of lubricant seal area 110.

FIG. 4 illustrates a bearing assembly 311 having a composite seal member 321. Composite seal member 321 includes a resilient foot 324 of a flexible rubber seal member 313, and a metal portion 312 which includes threads 314. Threads 314 engage threads 374 of threaded extension 373 which is part of axial extension 72. Composite seal member 321 is engaged with ring 70 by rotating the composite seal member so that threads 314 mesh with threads 374. A dam seal 390 includes a threaded metal member 392 which engages threads 383 of lip 384 which is part of ring 70.

The bearing assembly of the present invention provides substantial advantages over prior aircraft bearing assemblies because it is easily removable, withstands the high speeds effected during landing and takeoff, permits easy inspection, and is easily disassembled and reassembled. Both of the seals 90 and 120 can be removed easily and replaced without destroying or damaging the bearing assembly. Many prior bearing assemblies do not permit this, and such assemblies are damaged and destroyed if they are taken apart. The original parts of the present invention may continue to be utilized and thus reduce greatly the expense of repairs. The assembly enables the inner race 30 to be easily removed for inspection and replacement. Also, the entire bearing assembly may be easily removed from aircraft wheel 14. The bearing assembly does not require any modification of standard production tapered roller bearings for utilization therewith. Another distinct advantage is that the assembly is completely independent of aircraft wheel 14. In prior wheel/bearing assemblies, the wheel opening has snap ring grooves, anti-rotation notches, and a snap ring as part of an assembly that mounted a seal to the bearing wheel. During high speed rotation of the aircraft wheel, the wheel tends to change from an annular shape to an oval shape. This ovalization causes the seal to move away from the axle or assembly that it engages and permits grease to flow past the seal, in addition to greatly stressing the resilient functioning of the seal. The bearing assembly is not subject to wheel distortions as a result of ovalization, because it has seals that are part of a structure that is separate from wheel 14.

I claim:

1. A bearing assembly, comprising an annular inner race, an annular outer race having an inside diameter greater than an outside diameter of the annular inner race to provide an inner race-outer race annular space, bearing rollers disposed within said space, retaining means spacing said rollers apart from one another, the space having a first diameter at a first axial end which is smaller than a second diameter at a second axial end, and lubricant sealing means disposed about said first and second axial ends, the lubricant sealing means comprising a positioning ring having a first end member disposed over said first axial end and extending to a radial surface of said outer race, the first end member comprising a dam seal extending between the inner race and said ring in order to define a lubricant dam area at said first axial end, the ring formed over said outer race to form a radial portion extending into an axial portion each of which conforms with the shape of and engages said outer race, the axial portion having an axial extension extending axially at said second axial end, and a second end member of the ring comprising a composite seal member extending between said axial extension and said inner race to define a lubricant seal area about said second axial end.

2. The bearing assembly in accordance with claim 1, wherein the ring extends from a radial part at the lubricant dam area into a feed tapered section which extends at an angle to said radial portion, the feed tapered section causing lubricant to migrate toward said outer and inner races and rollers during operation of said bearing assembly.

3. The bearing assembly in accordance with claim 2, further comprising an aircraft wheel disposed about said bearing assembly, the radial and axial portions of said ring shaped complementary to and engaging portions of said wheel in order to seat said bearing assembly within said wheel.

4. The bearing assembly in accordance with claim 3, wherein said first end member disposed at said lubricant dam area comprises a first thickness which decreases in thickness at said feed tapered section, and the radial and axial portions comprise a further reduced thickness.

5. The bearing assembly in accordance with claim 4, wherein the radial and axial portions are reduced in thickness by means of the outer race being pressed into engagement therewith.

6. The bearing assembly in accordance with claim 1, wherein said composite seal member comprises an inner metallic member that is generally V-shaped and extends into two resilient feet, one resilient foot engaging said axial extension, and the other foot engaging said inner race in order to define a portion of the lubricant seal area at the second axial end.

7. The bearing assembly in accordance with claim 6, wherein the axial extension comprises a flange that extends radially away from said outer race in order to provide a ramp which receives and guides the first resilient foot of the composite seal member when the seal member is engaged with the axial extension.

8. The bearing assembly in accordance with claim 1, wherein the dam seal is disposed axially to engage the ring and inner race.

9. The bearing assembly in accordance with claim 8, wherein the first end member includes a radial part disposed radially relative to the axial portion and which receives an end of the dam seal.

10. The bearing assembly in accordance with claim 1, wherein the composite seal member includes an optional lubricant zert for transmitting lubricant into said bearing assembly.

11. The bearing assembly in accordance with claim 1, wherein said composite seal member comprises a hard heel stock material having disposed at portions thereabout a flexible sealing material in order to provide selectively stiffness to portions of the composite seal member, the axial extension including a groove which receives a complementary shaped portion of said heel stock material.

12. The bearing assembly in accordance with claim 11, further comprising selectively positioned notch means within said composite seal member in order to assist in removal of said composite seal member.

13. The bearing assembly in accordance with claim 1, wherein said composite seal member comprises an inner metallic ring and an outer flexible sealing material, the flexible sealing material extending at one end to a resilient foot engaging said inner race and extending at another end to an arm having a groove receiving a radial extension of said axial extension.

14. The bearing assembly in accordance with claim 1, wherein said composite seal member comprises a flexible material extending at one end to a resilient foot engaging said inner race and at an other end to a metal material joined to the flexible material, the metal material having threads which engage threads disposed within said axial extension in order to couple the composite seal member with said ring.

15. The bearing assembly in accordance with claim 14, wherein the dam seal includes a metal material having threads engaging threads at said ring.

* * * * *